United States Patent
Fortes Montilla et al.

(10) Patent No.: US 11,641,136 B2
(45) Date of Patent: May 2, 2023

(54) APPARATUS FOR HIGH-FREQUENCY NEAR-FIELD COMMUNICATION AND FOR INDUCTIVELY RECHARGING A PORTABLE ELECTRONIC DEVICE

(71) Applicant: Continental Automotive GmbH, Hannover (DE)

(72) Inventors: Amaia Fortes Montilla, Toulouse (FR); Youri Vassilieff, Toulouse (FR)

(73) Assignee: Continental Automotive GmbH

( * ) Notice: Subject to any disclaimer, the term of this patent is extended or adjusted under 35 U.S.C. 154(b) by 0 days.

(21) Appl. No.: 17/781,157

(22) PCT Filed: Oct. 14, 2020

(86) PCT No.: PCT/EP2020/078952
§ 371 (c)(1),
(2) Date: May 31, 2022

(87) PCT Pub. No.: WO2021/110309
PCT Pub. Date: Jun. 10, 2021

(65) Prior Publication Data
US 2023/0006476 A1    Jan. 5, 2023

(30) Foreign Application Priority Data

Dec. 3, 2019   (FR) ...................................... 1913641

(51) Int. Cl.
*H02J 50/60* (2016.01)
*H02J 50/12* (2016.01)
(Continued)

(52) U.S. Cl.
CPC ............ *H02J 50/12* (2016.02); *H01F 27/366* (2020.08); *H02J 50/402* (2020.01); *H02J 50/60* (2016.02);
(Continued)

(58) Field of Classification Search
CPC ....................................................... H02J 50/60
(Continued)

(56) References Cited

U.S. PATENT DOCUMENTS

| 2013/0072115 A1 | 3/2013 | Dobyns |
| 2014/0375137 A1 | 12/2014 | Ichikawa |

(Continued)

FOREIGN PATENT DOCUMENTS

| CN | 108430203 A | 8/2018 |
| FR | 3082370 A | 12/2019 |

(Continued)

OTHER PUBLICATIONS

Jadidian, J., et al., "Magnetic MIMO: How to Charge Your Phone in Your Pocket," MobiCom 2014, Sep. 7-11, Maui, Hawaii, pp. 495-506.

(Continued)

*Primary Examiner* — Edward Tso
*Assistant Examiner* — Ahmed H Omar
(74) *Attorney, Agent, or Firm* — RatnerPrestia (57) ABSTRACT

A device for high-frequency communication and for the inductive charging of an apparatus, including a charging surface, at least one charging antenna emitting a magnetic field at a low frequency and a layer of ferromagnetic material. The device includes at least one communication antenna and a printed circuit board. The communication antenna is in the form of a coil locally surrounding the layer with an axis of symmetry located in a plane parallel to the layer. The material of the layer is selected so as to have, at high frequency, an imaginary part with sufficiently high permeability to generate leaks on a surface of the layer extending perpendicular to the layer, while at the same time maintaining, at low frequency, an imaginary part with sufficiently low permeability to allow inductive charging.

14 Claims, 6 Drawing Sheets

(51) Int. Cl.
- *H01F 27/36* (2006.01)
- *H02J 50/40* (2016.01)
- *H04B 5/00* (2006.01)
- *H02J 50/80* (2016.01)
- *H02J 50/70* (2016.01)

(52) U.S. Cl.
CPC .............. *H02J 50/70* (2016.02); *H02J 50/80* (2016.02); *H04B 5/0031* (2013.01); *H04B 5/0037* (2013.01)

(58) Field of Classification Search
USPC .......................................................... 320/108
See application file for complete search history.

(56) References Cited

U.S. PATENT DOCUMENTS

| | | |
|---|---|---|
| 2017/0054213 A1 | 2/2017 | Singh et al. |
| 2018/0159358 A1 | 6/2018 | Yamaguchi et al. |
| 2020/0119597 A1* | 4/2020 | Cheikh .................. H02J 50/80 |
| 2020/0161040 A1 | 5/2020 | Hwang |
| 2021/0122334 A1* | 4/2021 | Spick ...................... G01V 3/08 |
| 2021/0242720 A1 | 8/2021 | Cheikh et al. |

FOREIGN PATENT DOCUMENTS

| | | |
|---|---|---|
| KR | 20160140026 A | 12/2016 |
| KR | 20190008810 A | 1/2019 |

OTHER PUBLICATIONS

International Search Report and Written Opinion for International Application No. PCT/EP2020/078952, dated Dec. 11, 2020, with partial English translation, 10 pages.

International Search Report and Written Opinion for International Application No. PCT/EP2020/078952, dated Dec. 11, 2020, 14 pages (French).

English Translation of the Written Opinion for International Application No. PCT/EP2020/078952, dated Dec. 11, 2020, 5 pages.

* cited by examiner

Fig 11 ly cover both the area of the back of the portable apparatus dedicated to the NFC antenna and the area of the back of said portable apparatus dedicated to the secondary antenna for the inductive charging.

APPARATUS FOR HIGH-FREQUENCY NEAR-FIELD COMMUNICATION AND FOR INDUCTIVELY RECHARGING A PORTABLE ELECTRONIC DEVICE

CROSS REFERENCE TO RELATED APPLICATIONS

This application is the U.S. National Phase Application of PCT International Application No. PCT/EP2020/078952, filed Oct. 14, 2020, which claims priority to French Patent Application No. 1913641, filed Dec. 3, 2019, the contents of such applications being incorporated by reference herein.

FIELD OF THE INVENTION

The invention relates to a device for high-frequency near-field communication, for example of NFC type, and for inductively charging a portable electronic apparatus.

More particularly, but not exclusively, the invention applies to inductive chargers of portable electronic apparatuses as inductive charging devices, the portable electronic apparatuses being intended to be installed on board a motor vehicle and comprising a high-frequency near-field, that is to say short-distance, communication device, in order to communicate with a portable apparatus once said equipment has been placed on the resting surface of the inductive charger. Near-field communication is understood to mean communication at a frequency situated around 13.56 MHz, but the present invention is applicable to any communication at a frequency between 3 MHz and 30 MHz that also allows near-field communication.

BACKGROUND OF THE INVENTION

Magnetic coupling-based charging devices for wirelessly charging portable electronic apparatuses, such as mobile telephones, laptop computers, touchscreen tablets, digital cameras, or even identity badges etc., are currently experiencing significant growth.

Conventionally, a magnetic coupling-based charging device includes at least one conductor coil, referred to as the "primary antenna", which is connected to a charging module. During charging of a portable apparatus, the charging module forms a charging signal that makes it possible to channel an electric current, the strength of which varies over time, through the primary antenna. The primary antenna that is thus supplied forms a variable magnetic field.

The portable apparatus includes a reception module including a conductive coil, referred to as the "secondary antenna". When the secondary antenna is placed within the variable magnetic field formed by the primary antenna, an electric current is induced in the secondary antenna. This electric current makes it possible to charge an electrical accumulator connected to the secondary antenna, thus supplying current to the portable apparatus.

The user places his portable electronic apparatus on a charging surface for supporting the portable apparatus and which also serves to support the portable apparatus during short-distance communication, so that the portable device is charged inductively, and so that it communicates before and during charging through near-field induction or NFC ("near-field communication") with the vehicle's on-board electronic system.

This short-distance wireless communication, generally of the order of a few millimeters, allows the vehicle, inter alia, to download a particular user profile contained in the portable apparatus and thus to adapt elements of the vehicle on the basis of this profile; for example, adjust the position of the driver's seat of the vehicle, program favorite radio stations, change the appearance of the dashboard, or even activate the "E-call" (emergency call) function, etc.

As is known, these communication and charging devices comprise at least one radiofrequency antenna dedicated to inductive charging, called charging antenna, of the WPC type ("Wireless Power Consortium", that is to say a wireless inductive charging antenna in accordance with the standards of this consortium), allowing inductive charging at low frequencies between 30 to 300 kHz, advantageously from 100 to 200 kHz and also at least one other antenna for communication at a frequency between 3 MHz and 30 MHz, advantageously 13.56 MHz, dedicated to this near-field communication.

It may also be any other radiofrequency antenna allowing communication through short-distance coupling between the portable apparatus and the charging device that is connected to the vehicle's on-board electronic system.

As is known, the primary WPC charging antenna is centered in the middle of the charging device in order to be aligned with respect to the secondary antenna of the portable apparatus, which is itself also generally located in the center of said equipment. The NFC antenna is generally arranged around the WPC antenna, all the way around the periphery of the charging device. Similarly, the NFC antenna of the portable apparatus is itself also located around the periphery of the back face of the portable apparatus and is therefore located facing the NFC antenna of the charging device when the portable apparatus is placed on the charging device, thereby allowing effective NFC communication.

Figure 1:
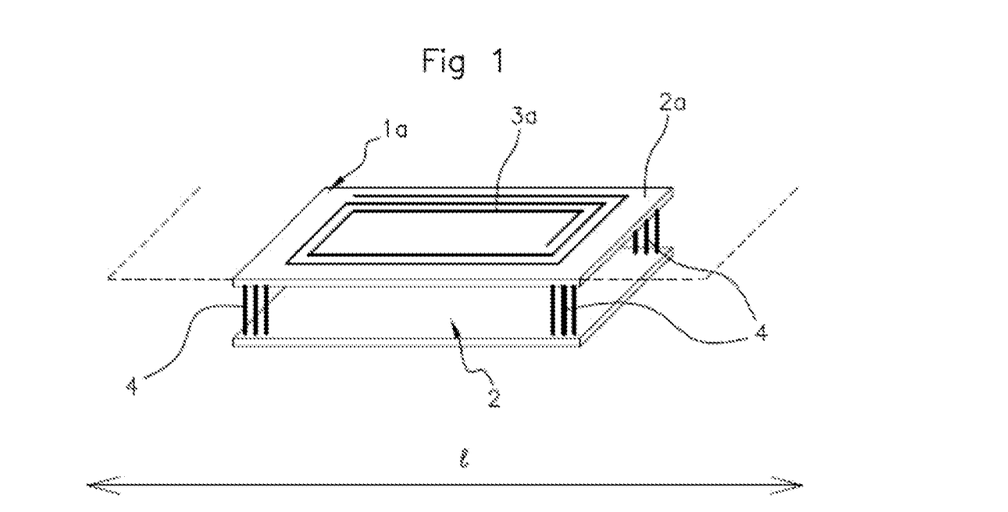
FIG. 1 is a schematic depiction of a perspective view of a device for NFC high-frequency near-field communication and for the inductive charging of a portable electronic apparatus according to the prior art.

With reference to FIG. 1, which shows an embodiment according to the closest prior art, a communication and charging device 1a according to the prior art comprises a main printed circuit board 2 for monitoring and controlling charging and/or communication and at least one electric power source for at least one primary charging antenna, not visible in this FIG. 1 and for at least one communication antenna 3a, hereinafter referred to as NFC antenna 3a.

According to this closest prior art, said at least one NFC antenna 3a is etched on a second printed circuit board 2a located above said at least one emitter antenna of the inductive charging device while being in a plane parallel to the main printed circuit board. This moves the primary emitter antenna away from the secondary antenna, in the form of a receiver coil, present in the portable electrical apparatus placed on the second board 2a, and this is detrimental to the inductive charging.

Also shown are connection pins 4, in the form of three pins arranged at the four corners respectively of the main printed circuit board 2 and of the second printed circuit board 2a, of substantially equivalent shape and size, while being rectangular.

In addition to this major drawback in the field of inductive charging, such a device for the inductive charging of a portable electronic apparatus and for near-field communication according to the prior art has several major drawbacks in the field of NFC communication.

A first drawback is that the NFC antenna makes it possible to cover only the central area of the device by virtue of being limited to the area for inductive charging.

A second drawback is that NFC communication is established mainly with portable electronic apparatuses whose NFC antenna is located in the center, generally around the secondary receiver antenna for charging.

A third drawback is that NFC communication is not guaranteed during inductive charging, the NFC communication antenna being strongly coupled with said at least one inductive charging emitter antenna.

A fourth drawback is great sensitivity to metallic portable electronic apparatuses, which generate a strong impedance mismatch for NFC communication.

A fifth drawback is unstable communication with electronic apparatuses whose NFC antenna is located in a peripheral area of the apparatuses, for example around a camera at the longitudinal end part of such apparatuses.

A sixth drawback is a limited communication area, with an area of coverage less than or equal to the size of the antenna printed on the second printed circuit board.

Lastly, a seventh drawback is that the presence of an antenna on the second printed circuit board decreases charging efficiency due to a greater distance resulting from the thickness of the second printed circuit board with layers of copper increasing the electrical resistivity in the inductive charging device.

In addition, one major drawback of inductive charging devices is the potential presence of foreign metal objects on the charging surface, which may heat up during charging of the portable electronic apparatus. These foreign metal objects, if they are not detected and if the charging is not stopped, may burn the user.

SUMMARY OF THE INVENTION

The problem on which an aspect of the present invention is based is, for a device for high-frequency near-field communication and for inductively charging a portable electronic apparatus, on the one hand, that of increasing the efficiency of the inductive charging and, on the other hand, that of guaranteeing uninterruptible near-field communication during the inductive charging and also making it possible, in one improvement, to reliably detect the presence of foreign metal objects on the charging surface.

Specifically, during near-field communication, magnetic coupling occurs between said at least one inductive charging emitter antenna and the communication antenna, which deteriorates the signal-to-noise ratio during communication at the electronic apparatus, an aspect of the present invention proposing to avoid this.

To this end, an aspect of the present invention relates to a device for high-frequency near-field communication, for example of NFC type, and for the inductive charging of a portable electronic apparatus, the device comprising, firstly for charging, a charging surface for supporting the portable electronic apparatus and at least one charging emitter antenna arranged underneath the charging surface and emitting a magnetic field at a low frequency selected between 30 and 300 kHz, a layer of ferromagnetic material being arranged below said at least one charging antenna, and, secondly for communication, at least one near-field communication antenna emitting a magnetic field at a high frequency between 3 MHz and 30 MHz, the device comprising a printed circuit board for monitoring and controlling charging and/or communication and at least one electric power source for said at least one charging antenna and for said at least one communication antenna, noteworthy in that said at least one communication antenna is in the form of at least one communication coil arranged with respect to the layer of ferromagnetic material such that part of the field created by said at least one communication coil passes through the layer of ferromagnetic material having a permeability comprising a real part and an imaginary part, the material of the layer of ferromagnetic material being selected so as to have a real part greater than 10 with, at the selected high communication frequency, a ratio between the imaginary part and the real part between 0.05 and 1 and, at the selected low frequency, a ratio between the imaginary part and the real part between 0 and 0.5.

These two ratios make it possible to have an imaginary part with sufficiently high permeability with respect to the real part to generate leaks at least partially on a surface of the layer of ferromagnetic material extending perpendicular to said surface, while at the same time maintaining, at the selected low frequency, an imaginary part with sufficiently low permeability with respect to the real part to allow inductive charging of the electronic apparatus.

The technical effect that is achieved is, for the inductive charging of a portable electronic apparatus, that of bringing the charging antennas closer to the charging surface, and therefore improving the efficiency of the near-field communication and of the charging. The thickness of the device is reduced due to the elimination of the second printed circuit board bearing the communication antenna, and there is no longer any need for connection elements between a main printed circuit board and a second board bearing a communication antenna.

In the prior art, the winding of a communication antenna located flat on the second printed circuit board did not make it possible to achieve satisfactory coverage in the surroundings of the device. This winding is now eliminated, as are the interconnections between the printed circuit board and the second printed circuit board, and replaced with metal loops forming a coil.

Figure 5:
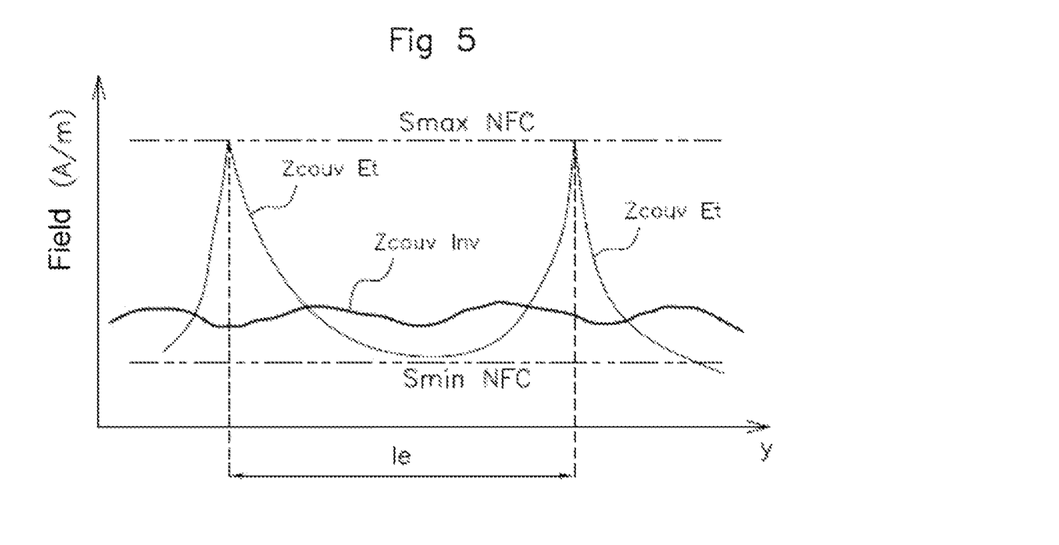
FIG. 5 shows two curves respectively illustrating coverage of the communication surroundings of the communication and charging device, respectively for the prior art and according to an aspect of the invention, specifically over a length of the device.

For near-field communication, coverage is extended with the possibility of establishing near-field communication during charging. As shown in FIG. 5, in the specific case of a device according to an aspect of the invention with two communication antennas, the communication coverage is uniform throughout the surroundings of the device and no longer comprises any magnetic field peaks.

The prior art made provision to stop inductive wireless charging during high-frequency near-field communication, the NFC communication antenna being strongly coupled with said at least one inductive charging emitter antenna. An aspect of the present invention, by decoupling the charging antenna or antennas from the communication antenna or antennas, makes it possible to avoid such stoppage.

The excitation of the ferromagnetic material by at least one communication antenna according to an aspect of the present invention makes it possible to channel the magnetic field so as to provide coverage throughout the central area of the device and generates a magnetic field that is oriented vertically with respect to the layer of material by virtue of the leaks resulting from the permeability of the material.

Magnetic permeability characterizes the ability of a material to modify a magnetic field, that is to say to modify magnetic flux lines. A magnetic permeability is defined in the form of a complex number whose imaginary part illustrates the leakage capacity of the magnetic field of the material. The higher this imaginary part is at a given frequency, the greater the leaks will be, the field lines preferably following the trajectories passing through areas of strong magnetic permeability.

The selection of the imaginary part of the permeability of the material depends on the device, for example on the type of communication antennas that are used, and cannot be reduced to a value and to a range of values. Those skilled in the art have the necessary skills, with knowledge of the high communication frequency and low frequency values selected for communication and charging, respectively, to select a ferromagnetic material having an imaginary permeability that is relatively low at the low charging frequency, the layer essentially serving at this low frequency to channel the magnetic flux, and that is relatively high at the high communication frequency, so that magnetic field leaks are possible along the ferromagnetic material.

This selection is based on a compromise between charging efficiency and near-field communication efficiency. The selection may be made using pre-established curves giving the imaginary permeability part as a function of an extended frequency field including low and high frequencies.

The near-field communication area is thus extended in particular for portable electrical apparatuses having a near-field communication antenna toward a longitudinal end. In addition, near-field communication becomes more stable during charging with some electronic devices, such as metallic mobile telephones.

With regard to the charging of the portable electronic apparatus, the device according to an aspect of the invention has a reduced distance between the charging antenna or antennas and the portable electrical apparatus, thereby making it possible to reduce energy losses and to increase charging efficiency.

For illustration, in a device according to the prior art, the distance between the portable apparatus and the charging antennas may be 7 mm, including 1.2 mm for the second printed circuit board which contains the communication antenna etched flat on this second board. The elimination of the second board made possible by the device according to an aspect of the present invention therefore reduces the distance between the charging antennas and the apparatus from 7 mm to 5.8 mm, and charging efficiency changes from 65% to 70%.

Preferably, but in a completely non-limiting manner, the communication coil locally surrounds the layer of ferromagnetic material.

Preferably, the communication coil has an axis of symmetry located in a plane parallel to the layer of ferromagnetic material.

Advantageously, said at least one communication antenna surrounds an end portion of the layer of ferromagnetic material. Specifically, the magnetic field should pass through the majority of the layer of ferromagnetic material.

Advantageously, said at least one communication antenna comprises a portion surrounding the printed circuit board or etched on the printed circuit board on a face of the printed circuit board facing said at least one charging antenna, and said at least one charging antenna rests on a face of the layer of ferromagnetic material opposite the printed circuit board.

Essentially, the layer of ferromagnetic material serves to channel the magnetic field during low-frequency charging and to distribute the magnetic field through leaks along the material during high-frequency communication.

Advantageously, a ratio between the imaginary part and the real part of the permeability of the layer of ferromagnetic material is between 0 and 0.2 for the selected low frequency and between 0.10 and 0.7 for the selected high communication frequency, the real part being greater than 100.

Advantageously, the device has a first gap between the portion of said at least one communication antenna oriented so as to be opposite the printed circuit board and a face of the layer of ferromagnetic material facing said at least one charging antenna, and a second gap between two respectively facing faces of the printed circuit board and the layer of ferromagnetic material, a ratio of the second gap to the first gap being greater than 6.

It is highly advantageous for all of the magnetic field leaks from the layer of ferromagnetic material to be oriented toward the charging surface and not toward the printed circuit board. The proposed selection of such gaps helps to orient the majority of the magnetic field leaks toward the charging surface.

Advantageously, the device comprises at least two communication antennas, with a first communication antenna arranged toward an end portion of the layer of ferromagnetic material and a second communication antenna arranged toward another end portion opposite the end portion bearing the first communication antenna.

This represents the preferred embodiment of the device according to an aspect of the present invention. The magnetic field is better distributed. A device with two communication antennas also allows operating variations by leaving one antenna in resonant mode while the other antenna is activated.

Advantageously, the at least one of the first or second communication antennas is in the form of a communication coil, firstly connected to a switch closing or opening a respective supply circuit, the supply circuit being connected to a main circuit comprising the electric power source for communication, and secondly comprising means for setting in resonance at the selected high frequency, connected to a setting in resonance control circuit.

There may be various variants for activating and/or resonating the communication antennas in order to optimize the communication according to the operating data.

Advantageously, the device comprises a setting in resonance control circuit shared by the coils of the first and second communication antennas, the setting in resonance control circuit comprising an inverting logic gate alternately supplying the means for setting the coil of the first communication antenna or that of the second communication antenna in resonance, the means for setting each communication antenna in resonance comprising at least one capacitor.

According to an aspect of the invention, two main switches are used in the supply circuit rather than three switches as used in a device according to the prior art. Inserting an inverting logic gate into the setting in resonance control circuit makes it possible to have a single control circuit for the two communication antennas and simplifies the design of the device.

Advantageously, the control circuit is connected to each switch of the main circuit and either puts it into a first position closing the supply circuit of one of the coils while leaving the supply circuit of the other coil open, or puts it into a second position closing the supply circuit of one of the coils while putting the other coil into resonant mode, a third position corresponding to the two switches put into the open position.

The two communication antennas may be active simultaneously, inactive simultaneously, one active and the other in resonant mode, one active and the other inactive. Specific advantages of each of the variants will be described later on.

Cleverly, the device furthermore comprises
a. means for measuring values of current, voltage, or phase shift between the voltage and the current at the terminals of at least one of the two communication antennas,
b. means for comparing said values thus measured with predetermined values,
c. means for determining the presence of a foreign metal object based on the result of said comparison.

The communication device, when it comprises two communication antennas, may thus also be used to detect the presence of a foreign metal object on the charging surface, just by adding said means described above.

Advantageously, the device comprises a third auxiliary communication antenna in the form of a coil extending perpendicular to the coil of said at least one communication antenna.

There may be one or more black spots in the coverage at the communication antenna or antennas. The presence of the third communication antenna serves to bridge this or these black spot(s) in the coverage. This third auxiliary communication antenna may have a median axis oriented perpendicular to the axis of the antenna or of each communication antenna.

Advantageously, the device comprises three charging antennas each in the form of a charging coil, two charging coils resting against the layer of ferromagnetic material while being spaced from one another, the third charging coil straddling the two charging coils, the three charging coils forming an assembly symmetrical about a median axis of the spacing extending perpendicular to the layer of ferromagnetic material.

BRIEF DESCRIPTION OF THE DRAWINGS

Other features and advantages of aspects of the invention will become more apparent from reading the description which follows. This description is purely illustrative and should be read with reference to the appended drawings, in which.

DETAILED DESCRIPTION OF THE PREFERRED EMBODIMENTS

Figure 2:
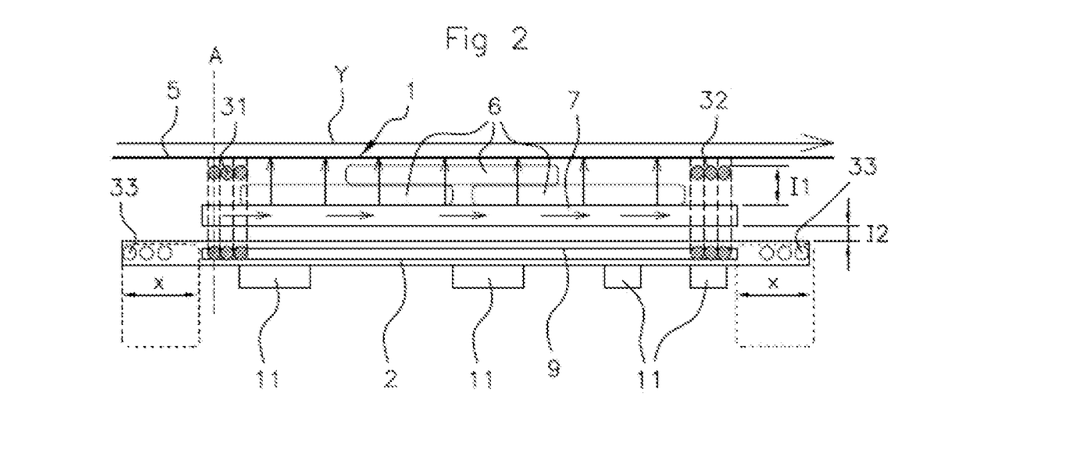
FIG. 2 is a schematic depiction of a longitudinal sectional view of a device for NFC high-frequency near-field communication and for the low-frequency inductive charging of a portable electronic apparatus according to one embodiment of the present invention, the communication antennas delivering a magnetic field passing through a layer of ferromagnetic material and leaking perpendicular to this layer opposite the printed circuit board.
Figure 6:
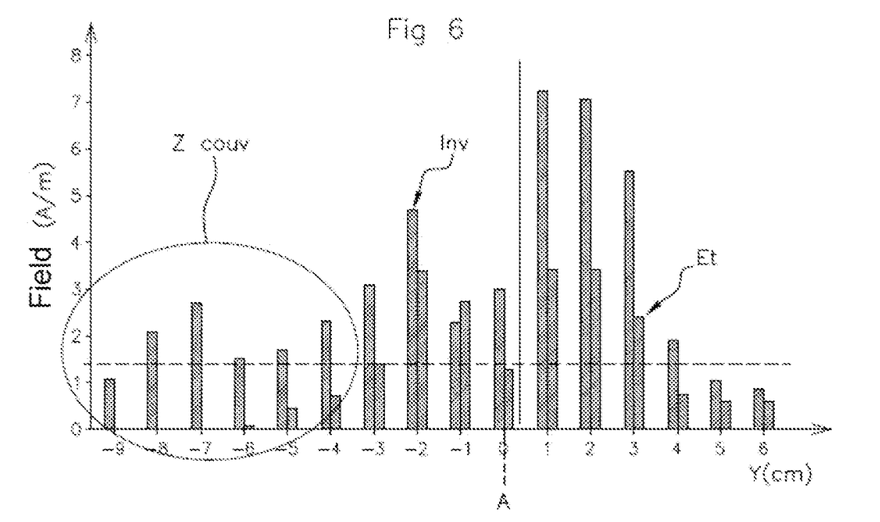
FIG. 6 shows magnetic field levels obtained at positions over a length of the device with respect to the center of the device for communication and charging devices, respectively according to the prior art and an aspect of the present invention, the device according to an aspect of the present invention having only one communication antenna.
Figure 7:
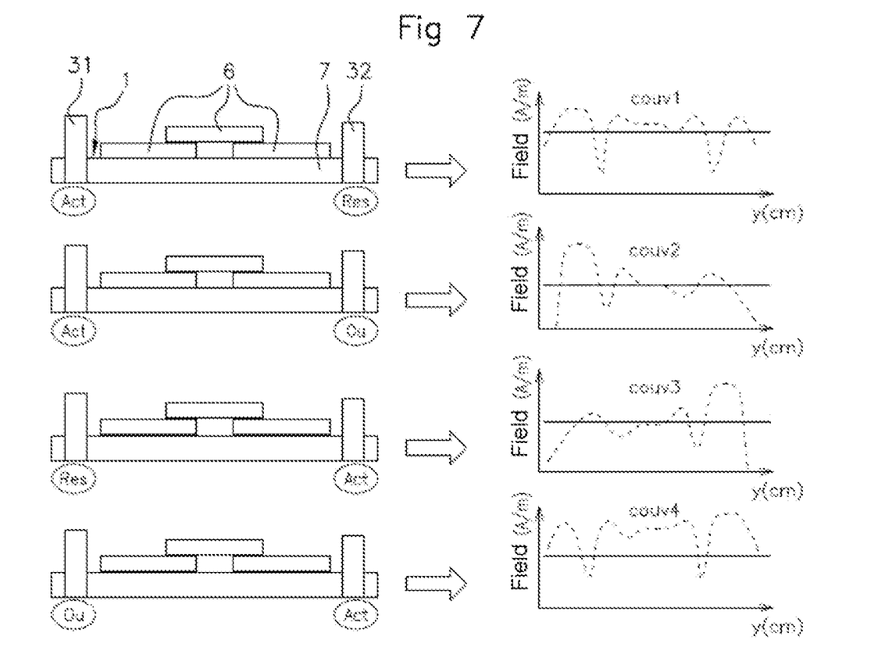
FIG. 7 shows four embodiments of communication and charging devices according to the present invention with two near-field communication antennas with, respectively, the communication antennas being either active, inactive or in resonant mode, four magnetic field curves being respectively associated with one of the four embodiments.

With reference to FIGS. 2 to 8 taken in combination and in particular to FIGS. 2 and 7, an aspect of the present invention relates to a device for high-frequency near-field communication, in this example of NFC type, and for the inductive charging of a portable electronic apparatus.

The device comprises, firstly for charging, a charging surface 5 for supporting the portable electronic apparatus, not visible in the figures, and at least one charging emitter antenna 6 arranged underneath the charging surface 5 and emitting a magnetic field at a low frequency selected between 30 and 300 kHz, advantageously from 100 to 200 kHz.

FIGS. 2 and 7 show three charging coils 6 each forming a charging antenna 6, this not being limiting. A layer 7 of ferromagnetic material, advantageously a ferrite bar, is arranged below the charging antenna or antennas 6.

The device 1 comprises, secondly for communication, at least one near-field communication antenna 31, 32 emitting a magnetic field at a frequency between 3 MHz and 30 MHz, advantageously 13.56 MHz. FIGS. 2 and 7 show two communication antennas 31, 32, advantageously in the form of coils, arranged at opposite respective ends of the layer 7 of ferromagnetic material, but this is not limiting, one communication antenna 31, 32 possibly being sufficient or an auxiliary communication antenna 33, visible in particular in FIG. 8, possibly being used between one or more communication antennas 31, 32 with a number of communication antennas 31, 32 possibly being greater than two.

The device 1 comprises a printed circuit board 2 for monitoring and controlling charging and/or communication and at least one electric power source 8 for the charging antenna or antennas 6 and for the communication antenna or antennas 31, 32. The electric power source 8 for the communication antenna or antennas 31, 32 is visible in FIG. 8.

There may be a shared electric power source for charging and communication, in which case the electric power source is able to deliver a high-frequency or low-frequency current depending on whether communication or charging is desired. In this case, it is not possible to perform charging at the same time as communication, unless the electric power source is duplicated. There may also be two specific electric power sources for communication and charging.

Figure 8:
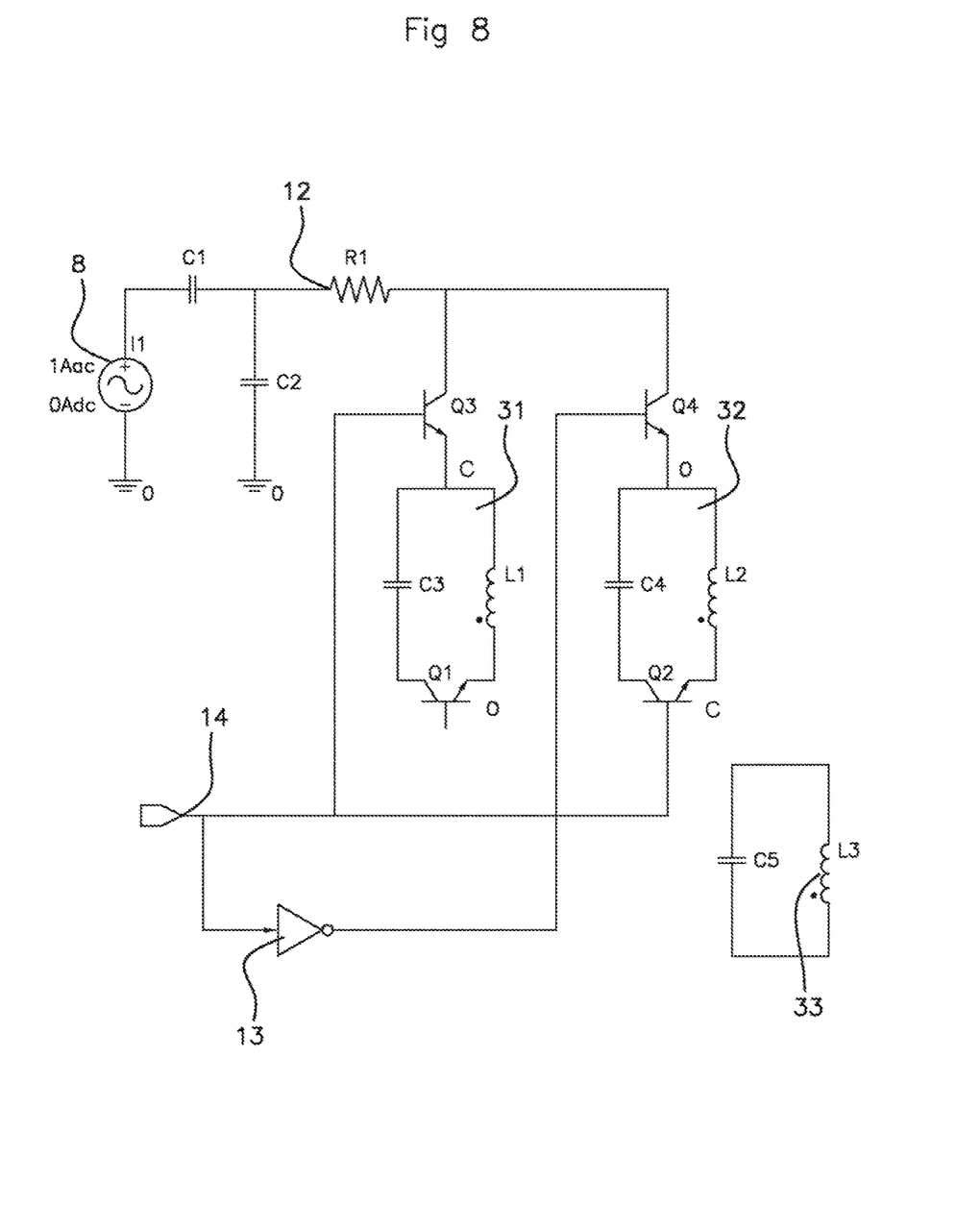
FIG. 8 shows one embodiment of a supply and resonance control circuit for a communication and charging device with two communication antennas according to the present invention, a first communication antenna possibly being active, inactive or in resonant mode, with, in the first case, the second communication antenna being in resonant mode, and active or inactive in the other cases.
Figure 9:
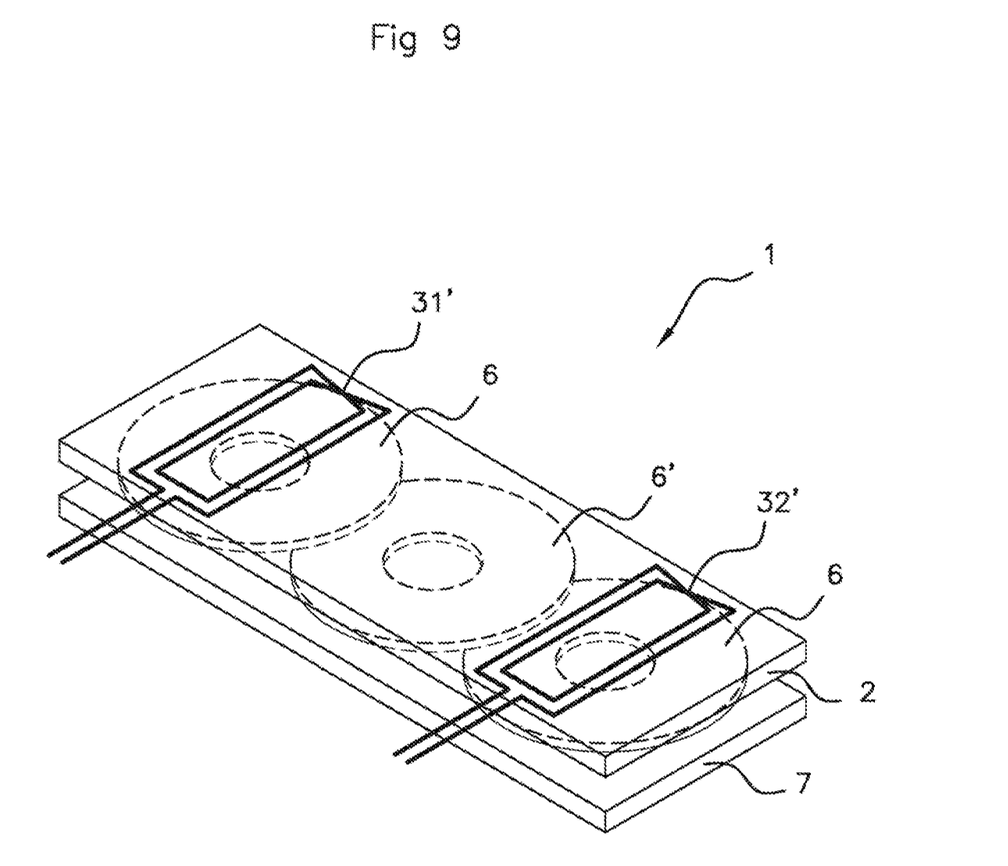
FIG. 9 is a plan view of a first variant of the communication device comprising two planar communication antennas.

According to an aspect of the present invention, the communication antenna or antennas 31, 32 is or are in the form of at least one communication coil locally surrounding the layer 7 of ferromagnetic material. Communication coils L1, L2 for first and second communication antennas 31, 32 are shown in FIG. 8.

In one preferred embodiment of the device 1, the antennas 31, 32 are wound around the layer 7 and have an axis of symmetry located in a plane parallel to said layer 7 of ferromagnetic material, this being illustrated in FIGS. 2 and 7.

Figure 10:
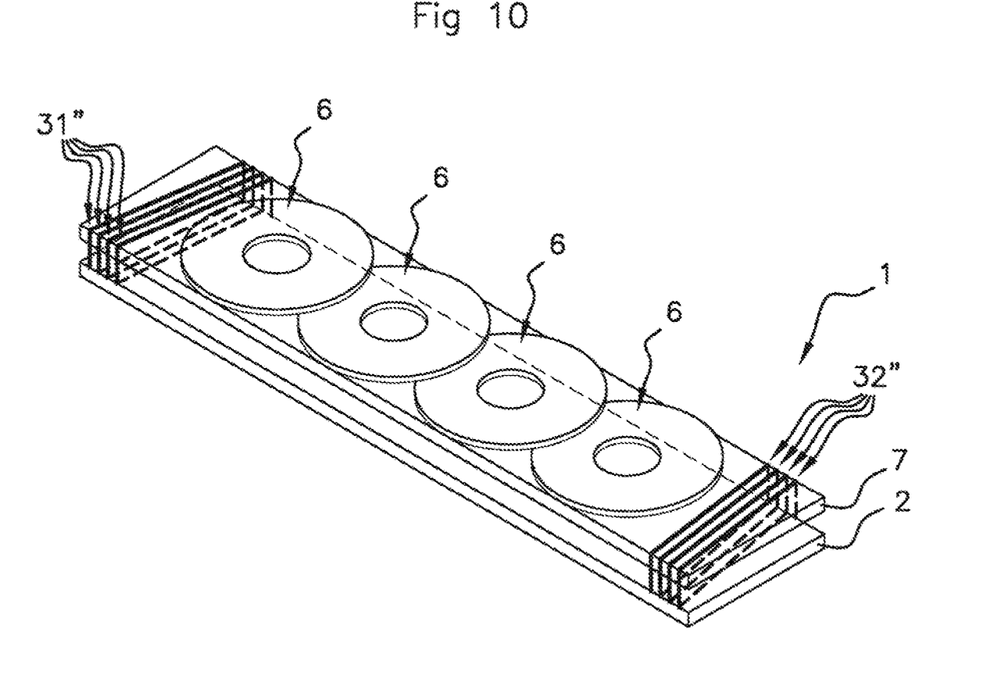
FIG. 10 is a plan view of a second variant of the communication device in which the communication antennas do not have an axis of symmetry located in a plane parallel to the layer of ferromagnetic material.

However, the preferred embodiment of the device 1 illustrated in FIGS. 2 and 7 is in no way limiting. The two antennas 31, 32 may take other forms; for example, the antennas 31, 32 may or may not be symmetrical, about an axis located in a plane parallel to said layer 7, and they may or may not be symmetrical with one another about this axis. For example, the antennas 31, 32 might not have an axis of symmetry located in a plane parallel to the layer 7, this being illustrated in FIG. 10, in which the antennas 31, 32 are wound in an offset manner around the layer 7. The antennas 31, 32 may also be planar, located in a plane parallel to the layer of ferromagnetic material 7.

However, it is essential to an aspect of the invention that the antennas 31, 32 are arranged such that part or all of the magnetic field that they emit passes through the layer of ferromagnetic material 7.

This means that part of the field created by said at least one communication coil, advantageously a large part or the majority of the magnetic field, passes through the layer 7 of ferromagnetic material by being channeled by this layer 7. Since this layer 7 of ferromagnetic material has a permeability comprising a real part Par r and an imaginary part Par i, there is provision in the context of an aspect of the present invention to select the layer 7 of ferromagnetic material such that the layer 7 has a real part greater than 10 with, at the selected high frequency, a ratio between the imaginary part and the real part between 0.05 and 1 and, at the selected low frequency, a ratio between the imaginary part and the real part between 0 and 0.5.

This causes high-frequency leaks extending perpendicular to the surface of the layer 7 of ferromagnetic material. An aspect of the invention also makes provision to select the layer 7 of ferromagnetic material such that the layer 7 maintains, at the abovementioned selected low frequency, a ratio between the imaginary part and the real part between 0 and 0.5 that is low enough to allow inductive charging of the electronic apparatus without excessive losses.

It is within the abilities of those skilled in the art to choose, from a plurality of layers 7 of ferromagnetic material, the most suitable one to be incorporated into the communication and charging device 1 according to an aspect of the present invention. This choice may be made in line with routine experiments or previously plotted permeability curves with real and imaginary parts in order to select the most suitable ferromagnetic material.

In FIG. 2, the total length of the device 1 is referenced l and follows the longitudinal axis Y symbolized by the arrow extending above the device 1. It is this total length that will be taken as length l on the abscissa of the curve in FIG. 3. The position of the communication antenna 31 on the longitudinal axis Y is referenced A.

Figure 3:
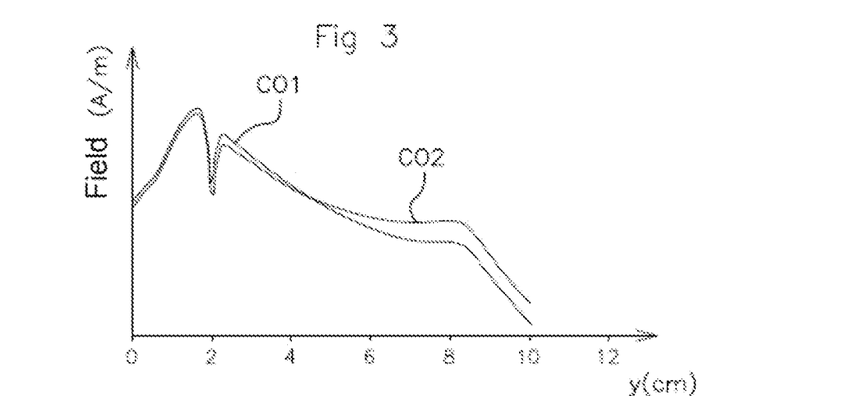
FIG. 3 shows a comparison of a magnetic field strength along a length for a layer of ferromagnetic material respectively not suitable and suitable for implementation in a device according to an aspect of the present invention.

With reference to FIG. 3, this figure shows two curves CO1 and CO2 of magnetic field strength in amps per meter emitted by a ferrite as a function of frequencies varying along a length of the ferrite as layer of ferromagnetic material.

What is desired is an increase in the magnetic field strength in a central area of the ferrite, for example between 6 and 8 cm.

The curve CO1 shows a magnetic field strength that is higher for lengths less than 5 cm than the curve CO2, but lower for lengths greater than 5 cm than the curve CO2. The ferrite corresponding to the curve CO1 is not optimized for the implementation of an aspect of the present invention, having a large real part and a small imaginary part at a high frequency.

This means that this ferrite corresponding to the curve CO1 makes it possible to obtain only a weak field strength in the central area between 6 and 8 cm, whereas what is called the optimized ferrite corresponding to the curve CO2, with a large real part and imaginary part at high frequency, for example 13.56 MHz, generates a greater magnetic field strength in this central area.

Without being limiting, a ferrite optimized for the implementation of an aspect of the present invention has a relatively low permeability at low frequency and a relatively high permeability at high frequency.

Figure 4:
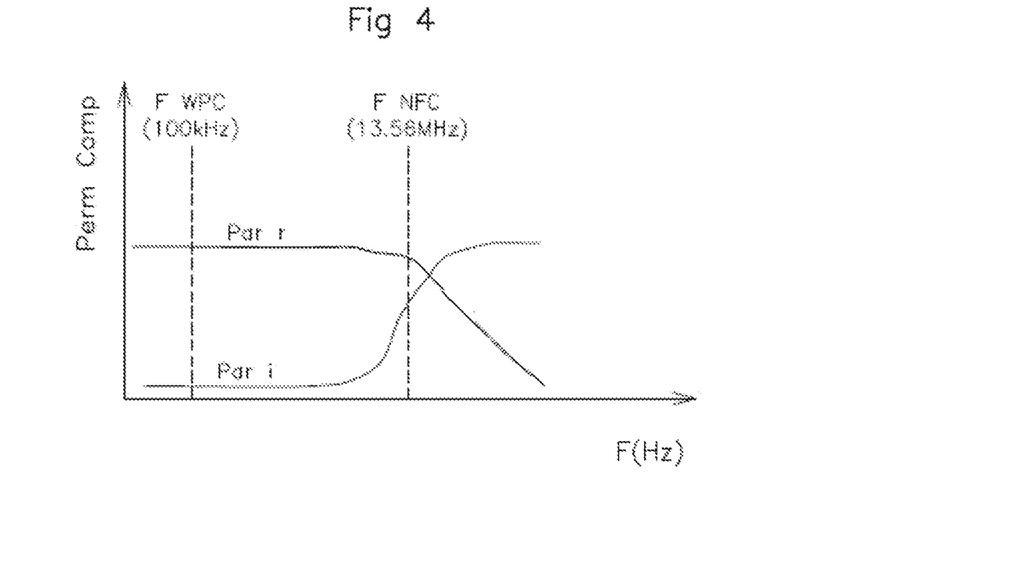
FIG. 4 shows curves of imaginary and real parts of a permeability evolving at frequencies for a layer of ferromagnetic material suitable for implementation in a device according to an aspect of the present invention.

FIG. 4 shows a curve of real part Par r and imaginary part Par i of a complex permeability Perm comp as a function of an operating frequency F(Hz) in Hertz. The vertical line further to the left indicates the low inductive charging frequency F WPC, advantageously 100 kHz, and the vertical line further to the right indicates the high near-field communication frequency F NFC, advantageously 13.56 MHz.

It may be seen that the imaginary part Par i increases for high frequencies and that the real part Par r decreases for these high frequencies, hence higher losses. In the context of an aspect of the present invention, it will be necessary to choose a ferrite with a permeability of the imaginary part Par i that is high at high frequency but with a sufficiently high real part.

With continuing reference more particularly to FIG. 4, a ratio of the imaginary part Par i to the real part Par r of the permeability of the layer 7 of ferromagnetic material may be between 0 and 0.2 for the selected low frequency and between 0.10 and 0.7 for the selected high frequency, the real part Par r being able to be greater than 100 for this high frequency.

FIG. 5, while still referring to FIGS. 1 and 2, shows a comparison between the coverage of a communication device 1 according to the prior art Zcouv Et and the coverage achieved by a communication device 1 according to an aspect of the present invention Zcouv Inv. In the case of an aspect of the invention as shown in FIG. 2, the communication device 1 comprises two communication antennas spaced apart by a length less than the total length of the device 1, the positions of the two communication antennas 31, 32 being illustrated by the intersection of a dotted vertical line on the scale of the lengths y.

In the case of the prior art, the two peaks each correspond to a respective branch extending laterally in the device 1a from the NFC communication antenna 3a etched on the second printed circuit board 2a, as shown in FIG. 1.

It is assumed that the two communication antennas 31 and 32 according to an aspect of the present invention have the same respective longitudinal location in the device as one of the lateral branches, this not necessarily being the case, the communication antennas 31 and 32 possibly having a greater distance between them and being more eccentric along the length of the device 1 than the lateral branches of the communication antenna 3a are with respect to one another.

The horizontal lines respectively indicate, for the lower one, the minimum near-field communication threshold Smin NFC and, for the higher one, the maximum near-field communication threshold Smax NFC. The amplitude of a magnetic field strength Field (A/m) in amps per meter in the area of coverage Zcouv Inv that is obtained by the device 1 according to an aspect of the invention varies less along the length of the device 1 along the Y axis than for an area of coverage according to the prior art Zcouv Et. In particular, in the case of an aspect of the present invention, the magnetic field peaks when passing through a communication antenna 31 or 2 are lower than when passing over a lateral branch of the communication antenna 3a. The distribution of the magnetic field of coverage is more uniform along the length of the device.

FIG. 6 shows the distribution of the strength of the magnetic field in amps per meter or A/m created according to a dimension of the device 1, advantageously an aspect of the length I of the near-field communication and charging device according to the present invention, comparing it to that from the prior art. The embodiment of the device according to the present invention is, in this non-limiting case, a device with two communication antennas, but the device is shown partially in this FIG. 6 and the magnetic field originating from the second communication antenna is not illustrated.

Point 0 on a scale graduated from −10 to +6 corresponds to the position referenced A of the first communication antenna 31 in FIG. 2. The magnetic field between points 0 and −10 is therefore outside the device if the length x and the auxiliary passive antenna 33 illustrated in FIG. 2 are not taken into account, whereas the magnetic field between points 0 and +6 is inside a portion of the device.

In each pair of bars, the bars further to the left are the bars relating to the magnetic field created by a device according to an aspect of the present invention Inv, whereas the bars further to the right are created by a device according to the prior art Et. The references Inv and Et are given only for a single respective bar, but apply either to all of the magnetic field bars obtained by a device according to an aspect of the invention In or to all of the magnetic field bars obtained by a device according to the prior art Et.

The area surrounded by an oval or Zcouv relates only to a device according to an aspect of the present invention at the first communication antenna 31, this area in the prior art not being covered by the antenna 3a located on the second printed circuit board 2a superimposed on the main printed circuit board 2 as shown in FIG. 1, given that the lateral branches of the antenna 3a are arranged at a distance from a respective longitudinal end of the device la. The reference I relates to the length of the device with a scale of lengths Y (cm) in centimeters on the abscissa.

It may be seen that the magnetic field obtained by a device according to an aspect of the present invention is always higher with one exception, at −1 cm, than the magnetic field obtained by a device according to the prior art.

Without being limiting and purely illustrative, with an electric current of 300 mA, the coverage measured with an 150-14443 Class 3 reference card is 2 to 3 cm according to the prior art and 4 to 9 cm according to an aspect of the present invention, with therefore 2 to 3 times more near-field communication coverage being obtained.

As may be seen in particular in FIGS. 2 and 7, the communication antenna or antennas 31, 32 surround an end portion of the layer 7 of ferromagnetic material.

Visible in particular in FIG. 2, the antenna or each communication antenna 31, 32 comprises a portion etched on the printed circuit board 2 on a face of the printed circuit board 2 facing said at least one charging antenna 6. As an alternative, the antenna or each antenna 31, 32 may comprise a portion surrounding the printed circuit board 2.

With regard to the inductive charging antenna or antennas 6, the antenna or several of the charging antennas 6 may rest on a face of the layer 7 of ferromagnetic material opposite the printed circuit board 2.

FIGS. 2 and 7 show two charging antennas 6 resting on the layer 7 of ferromagnetic material, with a third charging antenna 6 resting on the abovementioned charging antennas 6. In FIG. 2, the horizontal arrows show the path of the magnetic field originating from the first communication antenna 31 in the layer 7 of ferromagnetic material, and the vertical arrows show the magnetic field leaks from the layer 7 of ferromagnetic material distributed uniformly along a dimension of the layer 7 toward the charging surface 5, this dimension being the length I of the device 1.

With reference more particularly to FIG. 2, it is necessary to avoid the magnetic field leaks from being directed away from the charging surface 5, that is to say toward the printed circuit board 2.

To this end, the communication and charging device 1 may have a first gap I1 between the portion of the antenna or each communication antenna 31, 32 that is oriented so as to be opposite the printed circuit board 2 and a face of the layer 7 of ferromagnetic material facing said at least one charging antenna 6, and a second gap I2 between two respectively facing faces of the printed circuit board 2 and the layer 7 of ferromagnetic material. A ratio of the second gap I2 to the first gap I1 may be greater than 6, this not actually being the case in FIG. 2 but however being preferable.

With reference to FIGS. 2 and 7, the device 1 may comprise three charging antennas 6 each in the form of a charging coil. Two charging coils 6 may rest against the layer 7 of ferromagnetic material while being spaced from one another, the third charging coil straddling the two charging coils 6.

The three charging coils 6 may thus form an assembly symmetrical about a median axis of the spacing extending perpendicular to the layer 7 of ferromagnetic material.

As may be seen in FIGS. 2 and 7, the device 1, in its preferred embodiment, may comprise at least two communication antennas 31, 32. A first communication antenna 31 may be arranged toward an end portion of the layer 7 of ferromagnetic material and a second communication antenna 32 may be arranged toward another end portion opposite the end portion bearing the first communication antenna 31, advantageously at opposite longitudinal ends of the communication and charging device 1.

FIG. 2 shows a ground plane 9 within the printed circuit board 2, with end portions of the printed circuit board 2 not having a ground plane. An auxiliary passive antenna 33 may be housed in the end portions of the printed circuit board 2 not having a ground plane 9. A length x of the end portions of the printed circuit board 2 not having a ground plane 9 in a dimension that is advantageously the length I of the device may be less than one tenth of the total dimension of the printed circuit board 2 in this dimension.

The printed circuit board 2 may be supported by supports 11 located at a distance from one another, forming a discontinuous support for the device 1.

With particular reference to FIGS. 2, 7 and 8, the first and second communication antennas 31, 32 may be in the respective form of a communication coil L1, L2, the turns of the coil extending perpendicular to the plane of the layer 7 of ferromagnetic material. FIGS. 2 and 7 show three rows of turns, but this is of course not limiting.

With reference to FIG. 7, when the near-field communication and charging device 1 comprises two communication antennas 31, 32, it is possible to give these communication antennas 31, 32 different states, for example a state active Act for which the communication antenna 31, 32 is supplied with electric power, an inactive state Ou for which the supply circuit of the communication antenna 31, 32 is open and a resonance state Res for which the communication antenna 31, 32 is put into resonant mode.

FIG. 7 shows four near-field communication and charging devices 1 with different states for the communication antennas 31, 32 with coverage curves couv1 to couv4 obtained respectively by each of these devices 1 in their respective state. For simplicity, numerical references are indicated only for the first device 1, but also apply to the other three.

For the first device 1, the one at the top in FIG. 7, a first communication antenna 31 is active Act by virtue of being supplied with electric power, whereas the second communication antenna 32 is in resonant mode Res.

The first coverage curve Couv 1 is obtained. Keeping the second antenna 32 in resonant mode, this second antenna being the one further to the right in FIG. 7, makes it possible to increase the field strength in the layer 7 of electromagnetic material in order to cover the central area.

For the second device 1 starting from the top of FIG. 7, the first communication antenna 31 is active Act by virtue of being supplied with electric power, whereas the second communication antenna 32 is inactive Ou, its supply circuit being open.

The second coverage curve Couv 2 is obtained. Putting the second communication antenna 32 further to the right in an open circuit makes it possible to eliminate a shadow area at the antenna.

For the third device 1 starting from the top of FIG. 7, the first communication antenna 31 is in resonant mode Res, whereas the second communication antenna 32 is active Act by virtue of being supplied with electric power.

The third coverage curve Couv 3 is obtained. Keeping the first communication antenna 31 further to the left in resonant mode makes it possible to increase the field strength in the layer 7 of electromagnetic material in order to cover the central area.

For the fourth device 1 starting from the top of FIG. 7, the first communication antenna 31 is inactive Ou, its supply circuit being open, whereas the second communication antenna 32 is active Act by virtue of being supplied with electric power. The fourth coverage curve Couv 4 is obtained.

Figure 11:
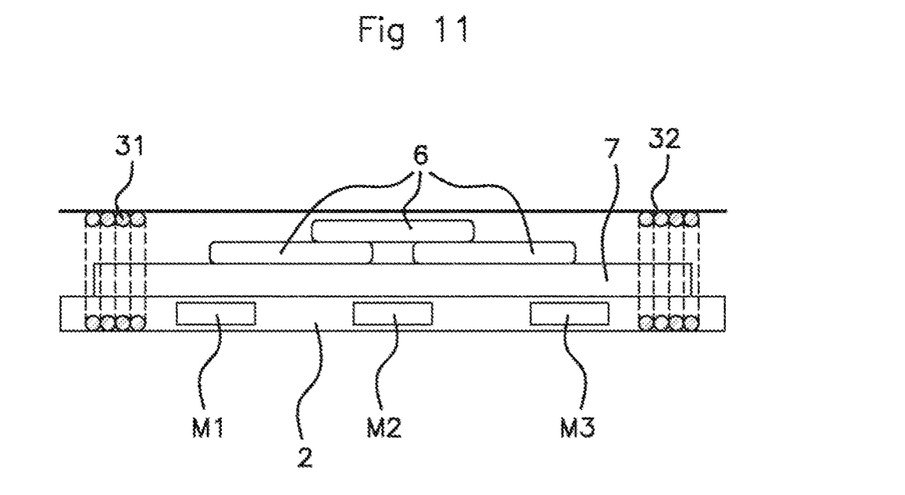
FIG. 11 is a schematic view of an improvement to the device according to an aspect of the invention in which the communication device is able to detect the presence of foreign metal objects on the charging surface.

In one improvement to the device 1 according to an aspect of the invention, and illustrated in FIG. 11, the device 1 also comprises;
a. means M1 for measuring values of current, voltage, or phase shift between the voltage and the current at the terminals of at least one of the two communication antennas 31, 32,
b. means M2 for comparing said values thus measured with predetermined values,
c. means M3 for determining the presence of a foreign metal object based on the result of said comparison.

The means mentioned above may take the form of software or electronic components integrated into the printed circuit and connected to a microprocessor.

Thus, by varying the configurations of the communication antennas 31, 32 as illustrated in FIG. 7, and by measuring the respective parameters at the terminals of the antennas, it is possible, through comparison with predetermined measurements performed beforehand, to determine the presence of foreign metal objects. Specifically, the presence of a foreign metal object on the charging surface modifies the electromagnetic field between the two antennas and modifies the following parameters at the terminals of the communication antennas 31, 32:
a. The voltage across the terminals of the communication antenna that is not active or open, or in resonant mode,
b. The current and/or the phase shift between the terminals of the active communication antenna.

The measurements performed beforehand may result from a calibration phase during which the measurements are performed for various types of metal objects placed on the surface of the device 1, or advantageously, the measurements performed beforehand were taken at a previous time. The measurements are thus performed dynamically, and any variation in the measurements over time may be detected, and if said variation exceeds a predetermined threshold, then this means that a foreign metal object is present on the resting surface.

With reference more particularly to FIG. 8, firstly each respective communication coil L1, L2 of a communication antenna 31, 32 may be connected to a switch Q3, Q4 closing or opening a respective supply circuit. The respective supply circuits of the communication coils may be connected in parallel with a main circuit 12 comprising the electric power source 8 for communication.

Secondly, each communication coil L1, L2 of a communication antenna 31, 32 may comprise means Q1, C3; Q2, C4 for setting each respective coil L1, L2 in resonance at the selected high frequency, connected in parallel with a setting in resonance control circuit 14.

The main circuit 12 comprises a radiofrequency matching circuit comprising a first capacitor C1 and a resistor R1 with a shunt to ground via a branch comprising a second capacitor C2, the branch being connected in between the first capacitor C1 and the resistor R1. The main circuit 12 supplies the first communication antenna 31 via a first main switch Q3 and, as a bypass, the second communication antenna 32 via a second main switch Q4.

The resonance control circuit 14 controls the selective resonance of the first or second communication antennas 31, 32, respectively via a first resonance switch Q1 and a second resonance switch Q2.

The references C and O near the switches Q1 to Q4 indicate the respective state of the switch with a closed circuit C or open circuit O.

The setting in resonance control circuit 14 comprises a first branch supplying, as a bypass, firstly the second resonance switch Q2 of the coil of the second communication antenna 32 and secondly the first main switch Q3 of the coil of the first communication antenna 31 in order to control it in the open O or closed position.

The setting in resonance control circuit 14 comprises a second branch branched off from the first branch supplying, as a bypass, firstly the first resonance switch Q1 of the coil of the first communication antenna 31 and secondly the second main switch Q4 of the coil of the second communication antenna 32 in order to control it in the open O or closed position.

The setting in resonance control circuit 14 may be shared, by virtue of its first and second branches, between the coils of the first and second communication antennas 31, 32. The setting in resonance control circuit 14 may comprise an inverting logic gate 13 in its second branch.

This inverting logic gate 13 may alternately supply the means Q1, C3; Q2, C4 for setting the coil of the first antenna 31 or that of the second communication antenna 32 in resonance, the means Q1, C3; Q2, C4 for setting each communication antenna 31, 32 in resonance comprising at least one capacitor C3, C4 branched off from the inductor L1, L2 of the respective coil of the first and second communication antennas 31, 32.

The control circuit 14 may be connected to each main switch Q3, Q4 of the main circuit 12 and either puts it into a first position closing the supply circuit of one of the coils while leaving the supply circuit of the other coil open, or puts it into a second position closing the supply circuit of one of the coils while putting the other coil into resonant mode.

It is however possible to provide a third position corresponding to the two main switches Q3, Q4 put into the open position and a fourth position corresponding to the two main switches Q3, Q4 put into in the closed position.

As shown in FIG. 8, the near-field communication and charging device may comprise a third auxiliary communication antenna 33 in the form of a coil extending perpendicular to the coil of said at least one communication antenna 31, 32. This auxiliary communication antenna 33 covers the coverage black spots at the first and second communication antennas 31, 32. The auxiliary communication antenna 33 comprises a capacitor C5 and a coil L3, similarly to the first and second communication antennas 31, 32.

An aspect of the invention therefore expediently makes it possible, through the position of the communication antennas and through the technical choice of the ferromagnetic material of the ferrite layer, to overcome the numerous problems from the prior art.

The invention claimed is:

1. A device for high-frequency near-field communication and for the inductive charging of a portable electronic apparatus, the device comprising, firstly for charging, a charging surface for supporting the portable electronic apparatus and at least one charging emitter antenna arranged underneath the charging surface and emitting a magnetic field at a low frequency selected between 30 and 300 kHz, a layer of ferromagnetic material being arranged below said at least one charging antenna, and, secondly for communication, at least one near-field communication antenna emitting a magnetic field at a high frequency between 3 MHz and 30 MHz, the device comprising a printed circuit board for monitoring and controlling charging and/or communication and at least one electric power source for said at least one charging antenna and for said at least one communication antenna, said at least one communication antenna being in the form of at least one communication coil arranged such that part of the field created by said at least one communication coil passes through the layer of ferromagnetic material having a permeability comprising a real part (Par r) and an imaginary part (Par i), the material of the layer of ferromagnetic material being selected so as to have a real part (Par r) greater than 10 with, at the selected high frequency, a ratio between the imaginary part (Par i) and the real part (Par r) between 0.05 and 1 and, at the selected low frequency, a ratio between the imaginary part (Par i) and the real part (Par r) between 0 and 0.5, said device comprising:
   a) at least two communication antennas, with a first communication antenna arranged toward an end portion of the layer of ferromagnetic material and a second communication antenna arranged toward another end portion opposite the end portion bearing the first communication antenna;
   b) means (M1) for measuring values of current, voltage, or phase shift between the voltage and the current at the terminals of at least one of the two communication antennas;
   c) means (M2) for comparing said values thus measured with predetermined, values; and
   d) means (M3) for determining the presence of a foreign metal object on the charging surface based on the result of said comparison.

2. The device as claimed in claim 1, wherein the communication coil locally surrounds the layer of ferromagnetic material.

3. The device as claimed in claim 1, wherein the communication coil has an axis of symmetry located in a plane parallel to the layer of ferromagnetic material.

4. The device as claimed in that claim 1, wherein said at least one communication antenna surrounds an end portion of the layer of ferromagnetic material.

5. The device as claimed in claim 1, wherein said at least one communication antenna comprises a portion surrounding the printed circuit board or etched on the printed circuit board on a face of the printed circuit board facing said at least one charging antenna, and said at least one charging antenna rests on a face of the layer of ferromagnetic material opposite the circuit board.

6. The device as claimed in claim 1, wherein a ratio of the imaginary part (Par i) to the real part (Par r) of the permeability of the layer of ferromagnetic material is between 0 and 0.2 for the selected low frequency and between 0.10 and 0.7 for the selected high frequency, the real part (Par r) being greater than 100.

7. The device as claimed in claim 1, wherein it has a first gap (I1) between the portion of said at least one communication antenna oriented so as to be opposite the printed circuit board and a face of the layer of ferromagnetic material facing said at least one charging antenna, and a second gap (I2) between two respectively facing faces of the printed circuit board and the layer of ferromagnetic material, a ratio of the second gap (I2) to the first gap (I1) being greater than 6.

8. The device as claimed in claim 7, wherein the at least one of the first and/or second communication antennas are or is in the respective form of a communication coil (L1, L2), firstly connected to a switch (Q3, Q4) closing or opening a respective supply circuit, the respective supply circuits of the communication coils (L1, L2) being connected in parallel with a main circuit comprising the electric power source (8) for communication, and secondly comprising means (Q1, C3; Q2, C4) for setting said respective coil (L1, L2) in resonance at the selected high frequency, connected in parallel with a setting in a resonance control circuit.

9. The device as claimed in claim 8, further comprising a setting in the resonance control circuit shared by the coils (L1, L2) of the first and second communication antennas, the setting in the resonance control circuit comprising an inverting logic gate alternately supplying the means (Q1, C3; Q2, C4) for setting the coil (L1) of the first communication antenna or that (L2) of the second communication antenna in resonance, the means (Q1, C3; Q2, C4) for setting each communication antenna in resonance comprising at least one capacitor (C3, C4).

10. The device as claimed in claim 9, wherein the resonance control circuit is connected to each switch (Q3, Q4) of the main circuit and either puts it into a first position closing the supply circuit of one of the coils (L1, L2) while leaving the supply circuit of the other coil open, or puts it into a second position closing the supply circuit of one of the coils (L1, L2) while putting the other coil into resonant mode, a third position corresponding to the two switches (Q3, Q4) put into the open position.

11. The device as claimed in claim 1, further comprising a third auxiliary communication antenna in the form of a coil (L3) extending perpendicular to the coil of said at least one communication antenna.

12. The device as claimed in claim 1, further comprising three charging antennas each in the form of a charging coil, two charging coils resting against the layer of ferromagnetic material while being spaced from one another, the third charging coil straddling the two charging coils, the three charging coils forming an assembly symmetrical about a median axis of the spacing extending perpendicular to the layer of ferromagnetic material.

13. The device as claimed in claim 2, wherein the communication coil has an axis of symmetry located in a plane parallel to the layer of ferromagnetic material.

14. The device as claimed in claim 8, wherein the resonance control circuit is connected to each switch of the main circuit and either puts it into a first position closing the supply circuit of one of the coils while leaving the supply circuit of the other coil open, or puts it into a second position closing the supply circuit of one of the coils while putting the other coil into resonant mode, a third position corresponding to the two switches put into the open position.

* * * * *

UNITED STATES PATENT AND TRADEMARK OFFICE
CERTIFICATE OF CORRECTION

PATENT NO. : 11,641,136 B2
APPLICATION NO. : 17/781157
DATED : May 2, 2023
INVENTOR(S) : Amaia Fortes Montilla and Youri Vassilieff It is certified that error appears in the above-identified patent and that said Letters Patent is hereby corrected as shown below:

In the Claims

In Column 16, Claim 8, Line 51, delete "(8)".

Signed and Sealed this
Thirteenth Day of June, 2023

Katherine Kelly Vidal
*Director of the United States Patent and Trademark Office*